(12) United States Patent
Halahmi et al.

(10) Patent No.: US 8,026,309 B2
(45) Date of Patent: Sep. 27, 2011

(54) PROCESS FOR PRODUCING COMPATIBILIZED POLYMER BLENDS

(75) Inventors: Izhar Halahmi, Hod Hasharon (IL); Oded Erez, Tel Aviv (IL); Adi Erez, Tel Aviv (IL)

(73) Assignee: PRS Mediterranean Ltd., Tel Aviv (IL)

( * ) Notice: Subject to any disclaimer, the term of this patent is extended or adjusted under 35 U.S.C. 154(b) by 455 days.

(21) Appl. No.: 12/040,488

(22) Filed: Feb. 29, 2008

(65) Prior Publication Data

US 2008/0214699 A1    Sep. 4, 2008

Related U.S. Application Data

(60) Provisional application No. 60/892,436, filed on Mar. 1, 2007.

(51) Int. Cl.
*C08L 23/26* (2006.01)
*C08L 77/00* (2006.01)
*B29B 7/30* (2006.01)

(52) U.S. Cl. ....... 525/66; 264/175; 264/176.1; 264/454; 264/464; 264/478; 264/328.1; 264/331.17; 264/331.19; 264/331.15; 524/13; 524/80; 524/401; 524/430; 524/502; 524/504; 524/514; 524/538; 525/63; 525/64; 525/69; 525/186; 525/218; 525/333.7; 525/342; 525/374; 525/375; 525/379; 525/383; 525/384; 525/385; 525/386

(58) Field of Classification Search .................. 264/175, 264/176.1, 328.1, 331.15, 331.17, 331.19, 264/454, 464, 478; 524/13, 80, 401, 430, 524/502, 504, 514, 538; 525/63, 64, 66, 525/69, 186, 218, 333.7, 342, 374, 375, 379, 525/383, 384, 385, 386
See application file for complete search history.

(56) References Cited

U.S. PATENT DOCUMENTS

| | | | |
|---|---|---|---|
| 4,814,379 A * | 3/1989 | Flood et al. ................. 525/66 |
| 5,369,168 A * | 11/1994 | Famili et al. ................. 525/57 |
| 5,612,401 A * | 3/1997 | Brown et al. ................. 524/413 |
| 5,703,167 A * | 12/1997 | Ohmae et al. ................. 525/207 |
| 5,814,384 A * | 9/1998 | Akkapeddi et al. .......... 428/35.7 |
| 6,106,650 A | 8/2000 | Cheshire |
| 6,667,107 B2 | 12/2003 | Tsuchikawa et al. |
| 6,797,216 B2 | 9/2004 | Furgiuele et al. |
| 6,908,573 B2 | 6/2005 | Hossan |
| 2004/0013833 A1 | 1/2004 | Lee et al. |
| 2004/0024130 A1 | 2/2004 | Nelson et al. |
| 2005/0171266 A1 | 8/2005 | Matthijssen et al. |
| 2005/0218551 A1 | 10/2005 | Halahmi et al. |
| 2006/0052472 A1 * | 3/2006 | Hansen et al. ................. 522/35 |

FOREIGN PATENT DOCUMENTS

| | | |
|---|---|---|
| EP | 0 128 775 | 6/1984 |
| EP | 0 754 731 A2 | 7/1996 |

OTHER PUBLICATIONS

International Search Report mailed Jun. 27, 2008, PCT/US08/55434.
European Search Report for EP 08714222, Jun. 8, 2009.

* cited by examiner

*Primary Examiner* — Roberto Rabago
(74) *Attorney, Agent, or Firm* — Fay Sharpe LLP; Richard M. Klein

(57) ABSTRACT

A process is provided for producing a compatibilized polymeric blend. A first thermoplastic polymer and a reactive moiety are provided to a progressive melt kneading apparatus. The reactive moiety comprises a first reactive group capable of reacting with the first thermoplastic polymer but not a second polymer and a second reactive group capable of reacting with the second polymer but not the first polymer. The first thermoplastic polymer and the reactive moiety are then melt kneaded so that the first reactive group reacts with the first thermoplastic polymer and the second reactive group is grafted to the first thermoplastic polymer, forming a molten self-compatibilizer. A molten second polymer is then provided. The molten self-compatibilizer is melt kneaded with the molten second polymer so that the second reactive group reacts with the second polymer to form a compatibilized polymeric blend. Also provided are articles formed from the compatibilized polymer blend.

28 Claims, 8 Drawing Sheets

(3 of 8 Drawing Sheet(s) Filed in Color)

PROCESS FOR PRODUCING COMPATIBILIZED POLYMER BLENDS

This application claims priority to U.S. Provisional Application Ser. No. 60/892,436, filed Mar. 1, 2007.

CROSS-REFERENCE TO RELATED APPLICATIONS

This application is related to U.S. patent application Ser. No. 11/680,961, filed Mar. 1, 2007, now U.S. Pat. No. 7,648,754, and entitled "UV RESISTANT MULTILAYERED CELLULAR CONFINEMENT SYSTEM"; to U.S. patent application Ser. No. 11/680,979, filed Mar. 1, 2007, now U.S. Pat. No. 7,541,084, and entitled "GEOTECHNICAL ARTICLES"; to U.S. patent application Ser. No. 11/680,987, filed Mar. 1, 2007, now U.S. Pat. No. 7,501,174, and entitled "HIGH PERFORMANCE GEOSYNTHETIC ARTICLE"; and, to U.S. patent application Ser. No. 11/680,996, filed Mar. 1, 2007, now U.S. Pat. No. 7,462,254, and entitled "WELDING PROCESS AND GEOSYNTHETIC PRODUCTS THEREOF". All four of these patent applications are hereby incorporated herein by reference in their entirety.

BACKGROUND

The present disclosure relates to a process for producing compatibilized blends of a first polymer and a second polymer to form a variety of articles having improved properties. More specifically, the disclosure relates to a process for manufacturing blends/compositions of a first relatively flexible polymer and a second relatively rigid polymer, as well as articles formed from such compatibilized polymer blends/compositions.

Compatibilized blends of relatively flexible hydrophobic polymers, such as polyolefins (PO), and relatively hydrophilic rigid polymers, such as engineering thermoplastic (ET) resins, have been made. However, due to the incompatible nature of the polyolefins and the engineering thermoplastic resins, and to the methods that have been used to form the blends, the products made therefrom have not exhibited optimal performance. The blends often exhibit large domains of one discontinuous phase dispersed within a continuous phase. In most cases, the discontinuous phase is made up of the minor component of the blend, and the continuous phase is made up of the major component of the blend.

Conventional methods of obtaining a compatibilized blend also require a multiple step process, wherein in a first apparatus, a polyolefin or other polymer is functionalized to form a compatibilizer, the compatibilizer is isolated, e.g. as pellets or powder, and the compatibilizer is subsequently mixed with the engineering thermoplastic in a second mixing apparatus. The product made from mixing the compatibilizer with the engineering thermoplastic resin is then isolated, e.g. formed as pellets, and subsequently used to form final, end-use articles or products. This plurality of steps is labor intensive, consumes excessive amounts of energy, and causes undesirable degradation of the polymer blend in the subsequent remelting and product formation steps.

Moreover, attempts to provide the engineering thermoplastic downstream in the same machine that is producing the compatibilizer have failed. This is generally due to poor melting of the solid engineering thermoplastic in the molten compatibilizer. The reason for this concerns differences in the melting temperatures. While most polyolefins melt in the range of 50 to 165° C., typical engineering thermoplastic melt in the range of 200-300° C. (Polyamide 6, Polyamide 66, polyethyleneterephthalate (PET), etc.).

For example, in conventional methods, a compatibilizer may be formed "in-house" or purchased from a specialty manufacturer. This compatibilizer is then mixed with an appropriate combination of solid polyolefin and engineering thermoplastic (in the form of pellets, flakes, granules or powder) and melt kneaded (usually in an the extruder or co-kneader) to yield a product, e.g. pellets of the compatibilized blend. Usually, due to differences in melting temperature, the fraction of the engineering thermoplastic polymer is greater than the fraction of the lower melting polymer, in order to enable enough friction between the extruder screw and barrel during melting phase. Due to these limitations, typical compatibilized blends comprise about 5-30% w/w of the lower melting temperature polymer. The pellets are then subsequently provided to another machine to form the final, end-use product. The compatibilizer, whether purchased from the specialty manufacturer, or formed in a separate "in-house" process, is expensive. Moreover, the energy that is invested to melt and graft the monomers to form the compatibilizer is lost during subsequent cooling and pelletizing steps. The need to remelt the compatibilized blend in the process of forming the final, end-use product results in a waste of about 30-60 USD ($)/ton in lost energy and also results in degradation of the polymer blend.

Another deficiency of the present technologies of forming alloys (blends that have useful physical properties) of polyolefins or other low melting polymers (styrenic for example) with engineering thermoplastics with higher strength, stiffness and melting point (Polyamide 6, Polyamide 66, polyethyleneterephthalate (PET), etc.) is a limitation derived from the different melting temperatures: since the polyolefin melts first, the engineering thermoplastics are not melted well if a blend of dry pellets or powders or flakes of both is fed to an extruder or similar melt kneader. The reason for that is once the lower melting temperature polymer is melted, the molten material lubricates the pellets of the higher melting point polymer and avoids the essential friction of the pellets with the extruder barrel. Due to this, alloys typically comprise more than 60% engineering thermoplastics and less than 40% polyolefin (for example Orgalloy™ by Arkema). In order to manufacture alloys comprising less than 60% and more preferred less than 40% engineering thermoplastics, further remelting and mixing steps are required. Consequently, the steps then consist of making the compatibilizer, mixing solid compatibilizer with 60% or more engineering thermoplastics and 40% or less polyolefin and melt kneading to form solid alloy comprising 60% or more engineering thermoplastics. This solid alloy is then blended with polyolefin pellets or powder or flakes, fed to an extruder or alike, remelted and melt kneaded to form solid alloy comprising less than 60% engineering thermoplastic.

Consequently, there is a need to provide for more efficient processes for producing compatibilized polymer blends which, among other things, save energy, are less costly, enable production of alloys comprising less than 60% engineering thermoplastic in at most two melt kneading steps and produce less degradation of the product through excessive reprocessing.

BRIEF DESCRIPTION

The present disclosure is directed to an improved process for forming stable polymer blends, and alloys thereof, as well as to products made from such blends and alloys. The polymer blends comprise of compatibilized polymeric compositions.

In one embodiment, the process comprises:
providing at least one first thermoplastic polymer, a reactive moiety, an optional initiator, and an optional catalyst to an upstream portion of a first progressive melt kneading apparatus, the reactive moiety comprising a first reactive group capable of reacting with the first thermoplastic polymer but not with a second polymer to be subsequently provided and a second reactive group capable of reacting with the second polymer but not with the first thermoplastic polymer;
melt kneading the first thermoplastic polymer and the reactive moiety so that the first reactive group reacts with the first thermoplastic polymer and grafts the second reactive group to at least one portion of the first thermoplastic polymer, thereby forming a molten functionalized polymer, refer hereinafter as self-compatibilizer;
providing at least one molten second polymer to the first progressive melt kneading apparatus; and
melt kneading the molten self-compatibilizer with the molten second polymer at a downstream portion of the first progressive melt kneading apparatus so that the second reactive group reacts with at least one portion of the molten second polymer to form the compatibilized polymeric composition.

The process may also further comprise providing an optional initiator, an optional catalyst, or a reaction accelerator to the upstream portion together with the thermoplastic polymer and the reactive moiety. The initiator may be a free radical initiator, cationic initiator, or anionic initiator.

The fact the second polymer is fed as melt, enables providing engineering thermoplastic (as second polymer) to a molten functionalized polyolefin (as first polymer) at any ratio, thus enabling production of alloys comprising less than 60% more preferred 5-40% engineering thermoplastic.

In other embodiments, the process further comprises the step of extruding the compatibilized polymeric composition in the shape of a finished product.

In additional embodiments, the process further comprises the step of extruding the compatibilized polymeric composition as a pellet, granule, flake, or powder. The process may further comprise remelting the pellet, granule, flake, or powder and extruding or molding an article from the remelt.

In some embodiments, the process further comprises the step of molding the compatibilized polymeric composition into the shape of a finished product. The molding may be done by blow molding, compression molding, transfer molding, injection molding, sheet extrusion followed by compression molding, or calendaring.

The first thermoplastic polymer may comprise a polyolefin, an ethylene copolymer, an ethylene terpolymer; ethylene-acrylic esters and ethylene-methacrylic esters; polystyrene; styrene copolymers and terpolymers; styrenic block copolymers; butyl rubber; acrylonitrile butadiene rubber; butadiene rubber; copolymers and terpolymers of butadiene; natural rubber; polyisoprene rubber; ethylene-propylene elastomers; polychloroprene; hydrogenated nitrile rubber (HNBR); silicones; polysulfide polymers; vinyl polymers; or copolymers, block copolymers, blends or combinations thereof.

In specific embodiments, the first thermoplastic polymer comprises a polyolefin, ethylene copolymer, or ethylene terpolymer. The polyolefin, ethylene copolymer or ethylene terpolymer may comprise polyethylene, ethylene-vinyl acetate, polypropylene, ethylene-alpha olefin elastomer, ethylene-propylene elastomer, ethylene-propylene diene elastomer, ethylene-acrylate ester or methacrylate ester copolymer or terpolymer, or any copolymer or combination of any two or more thereof.

The second polymer may be an engineering thermoplastic resin comprising a polyester; terephthalic acid polyesters, an aliphatic polyester; polycarbonate; a polyester elastomer; a polyamide; a polyphthalamide; a polyamide elastomer; a polyurethane; a polyimide; a polysulfone; a polyphenylene ether; a polyphenylene sulfide; a polysulfone; a liquid crystalline polymer (LCP); polyetheretherketone (PEEK); polyphenylsulfone; polyamide-imide; polyolefins, polyolefin copolymers and terpolymers; EVA; ethylene-acrylic ester and ethylene-methacrylic ester; polystyrene; styrene copolymers and terpolymers; styrenic block copolymers; butyl rubber; nitrile rubber; butadiene rubber; copolymers and terpolymers of butadiene; natural rubber; polyisoprene rubber; ethylene-propylene elastomer; polychloroprene; silicone polymer; polysulfide; a vinyl polymer; an acrylic polymer; a fluoropolymer; or copolymers, block copolymers, blends or combinations thereof.

In some embodiments, the molten second polymer is provided from at least one additional melt kneading apparatus into a feed aperture in the first apparatus. In other embodiments, the molten second polymer is provided from at least one batch mixer into a feed aperture in the first apparatus. In particular embodiments, a continuous melt kneader is coupled to at least one more continuous melt kneader. In more specific embodiments, at least one of the continuous melt kneaders is an extruder. In other specific embodiments, at least one of the continuous melt kneaders is a batch mixer.

In other embodiments, the process further comprises the step of adding at least one additive through at least one feed aperture to a melt kneading apparatus. The additive may comprise a short fiber selected from the group consisting of glass fiber, ceramic fiber, natural fiber, aramid fiber, mineral fiber, metal fiber, carbon fiber, organic polymer fiber, and combinations thereof.

In additional embodiments, the process further comprises adding at least one roving. The roving may be added subsequent to melt kneading the molten self-compatibilizer with the molten second polymer.

The roving may comprise a fiber selected from the group consisting of glass fiber, ceramic fiber, natural fiber, metal fiber, carbon fiber, organic polymer fiber, and combinations thereof.

In other embodiments, the process further comprises adding a filler selected from the group consisting of a metal oxide, a metal carbonate, a metal sulfate, a metal phosphate, a metal silicate, a metal borate, a metal hydroxide, a silica, a silicate, an aluminate, an alumo-silicate, chalk, talc, dolomite, saw dust, wood flour, milled natural fibers, newsprint, a metal powder, metal-coated inorganic particles, clay, kaolin, industrial ash, concrete powder, cement, wollastonite, and combinations thereof.

The process may further comprise adding an unmodified polymer or an external compatibilizer after the molten self-compatibilizer is formed. The unmodified polymer can be selected from the group consisting of polyethylene; ethylene-vinyl acetate; polypropylene; ethylene-alpha olefin polymer; ethylene-propylene elastomer; ethylene-propylene diene elastomer; polyolefin; an ethylene copolymer; an ethylene terpolymer; ethylene-acrylic esters and ethylene-methacrylic esters; polystyrene; styrene copolymers and terpolymers; styrenic block copolymers; butyl rubber; acrylonitrile butadiene rubber; butadiene rubber; copolymers and terpolymers of butadiene; natural rubber; polyisoprene rubber; polychloroprene; hydrogenated nitrile rubber (HNBR); silicones;

polysulfide polymers; vinyl polymers; polyester; an aliphatic polyester; polycarbonate; polyester elastomer; polyamide; polyphthalamide; polyamide elastomer; polyurethane; polyimide; polysulfone; polyphenylene ether; polyphenylene sulfide; polysulfone; liquid crystalline polymer (LCP); polyetheretherketone (PEEK); polyphenylsulfone; polyamideimide; polyolefins; polyolefin copolymers and terpolymers; EVA; nitrile rubber; an acrylic polymer; fluoropolymer; or copolymers, block copolymers, blends or combinations thereof.

The external compatibilizer may comprise a copolymer or terpolymer of an unsaturated monomer and a functional unsaturated monomer, or a polymer grafted by at least one functional group. Examples of external compatibilizers are ethylene-acrylic ester-maleic anhydride terpolymers, ethylene-methacrylic ester-maleic anhydride terpolymers, ethylene-acrylic ester-glycidyl methacrylate terpolymers and alike.

The process may further comprise adding nano-size particles comprising a material selected from the group consisting of metal oxides, metal carbonates, metal silicates, metal sulfates, metal phosphates; clay; silica; silicates; alumosilicates; zinc oxide; titanium oxides; zirconium oxides; talc; nanotubes; metal particles and/or flakes; carbon black; sulfides and sulfates; plant or animal originated cellulose, lignin, or proteins; and combinations thereof.

In additional embodiments, the process further comprises adding a pigment or dye, an ultraviolet (UV) absorber, a heat stabilizer, a light stabilizer, a processing aid, a plasticizer, a blowing and/or foaming agent, external compatibilizer, or carbon black.

In further embodiments, the first progressive melt kneading apparatus is an extruder.

The processes of the present disclosure do not require multiple cycles of cooling and remelting, between the formation of the compatibilizer and the formation of the final product. Of course, if it is desirable, intermediate products can be isolated for subsequent remelting.

In still further embodiments, the compatibilized polymeric composition is sent to a direct extrusion or a direct molding process. In this regard, the term "direct" means that the melt is transferred to a mold or die, and the molten compound is cooled to the final shape.

In the embodiments, the second reactive group is reactive with one or more groups on the second polymer. Thus, the first thermoplastic polymer and the second polymer can graft to each other and form a compatibilized polymeric composition.

The resulting compatibilized polymeric composition may have a continuous phase and a dispersed phase, and the dispersed phase can have an average size of less than 10 microns.

Articles formed from the compatibilized polymeric composition may comprise a dispersed roving, wherein the roving has an average length of less than 1 mm, less than 5 mm, less than 50 mm, greater than 50 mm, or an average length equal to the length of the article itself. The article may also be formed by remelting an intermediate product formed from the compatibilized polymeric composition.

The process may further comprise the step of producing a product from the compatibilized polymeric composition. This step may be performed by pumping the molten compatibilized polymeric composition to a direct molding or direct extrusion process. In other words, there is no intermediate process of cooling and remelting the compatibilized polymeric composition.

The product may have the shape of a three-dimensional article, sheet, film, profile, tube, pipe, beam, pellet, granule, flake, or powder. The product can be produced or formed by extrusion, pultrusion, pushtrusion, blow molding, compression molding, transfer molding, injection molding, sheet extrusion followed by compression molding, or calendaring.

These and other non-limiting embodiments are described in more detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a brief description of the drawings, which are presented for the purposes of illustrating the exemplary embodiments disclosed herein and not for the purposes of limiting the same.

These figures are merely schematic representations based on convenience and the ease of demonstrating the present disclosure, and are, therefore, not intended to indicate relative size and dimensions of the devices or components thereof and/or to define or limit the scope of the exemplary embodiments.

DETAILED DESCRIPTION

The term "self compatibilizer" refers herein to a modified polymer (a compatibilizer) derived from an unmodified polymer in which (1) a portion of the unmodified polymer is grafted or functionalized by a reactant containing, after grafting, at least one reactive group per molecule capable of reacting with another polymer that is incompatible with first unmodified polymer; and (2) the grafting or functionalizing takes place as part of the manufacturing process of a melt blending with at least one second polymer. The process may be coupled as well to the process of making the final, end-use product. In other words, a self-compatibilizer gains its reactive group during the manufacturing process.

The term "external compatibilizer" refers herein to a modified polymer, copolymer, or terpolymer containing a reactive group that is provided to the manufacturing process and already contains the reactive group when provided. For example, the external compatibilizer may be commercially obtained or it may be formed in a parallel, but distinct, manufacturing process.

The present disclosure provides a one-step process in which a self-compatibilizer is formed from a first polymer, melt kneaded with a molten second polymer, melt kneaded with optional additives, and then melt kneaded to form a compatibilized polymeric composition. The unmodified first and second polymers are incompatible and thus without the grafting stage, the result is a blend having poor physical properties. The compatibilized polymeric composition can then be directly provided to subsequent molding or extrusion steps from which a finished product may be obtained. The process takes place in a suitable continuous, progressive melt kneading apparatus, such as an extruder.

In embodiments, the process comprises:

i) providing a first thermoplastic polymer and a reactive moiety to an upstream portion of a first progressive melt kneading apparatus, the reactive moiety comprising a first reactive group reactive towards the first thermoplastic polymer but not with a second polymer which is subsequently provided and a second reactive group reactive with the second polymer but not with the first thermoplastic polymer;

ii) melt kneading the first thermoplastic polymer and the reactive moiety so that the first reactive group reacts with at least one portion of the thermoplastic polymer and grafts the second reactive group to the first thermoplastic polymer, thereby forming a molten self-compatibilizer;

iii) providing a molten second polymer to the first progressive melt kneading apparatus; and iv) melt kneading the molten self-compatibilizer with the molten second polymer at a downstream portion of the first progressive melt kneading apparatus so that the second reactive group reacts with at least one portion of the second polymer to form the compatibilized polymeric composition.

The compatibilized polymeric composition is characterized by more than one discrete phases, wherein the first phase is continuous or semi-continuous and at least one other phase is dispersed in the first phase as nodules, lamellas, rod like domains, amorphous shape domains, and/or interpenetrating network structures. The reaction product between the self-compatibilizer and the second polymer stabilizes the dispersion in melt form and in solid form. Without the compatibilizer, the blend will tend to disintegrate and no practical usage may be obtained. Usually the average size of the dispersed phase in the compatibilized blend is smaller than the average size of the dispersed phase in the un-compatibilized blend.

The first thermoplastic polymer may be an unmodified polyolefin, ethylene copolymer or ethylene terpolymer. The thermoplastic polymer can be selected from polyethylene, ethylene-vinyl acetate, polypropylene, ethylene-alpha olefin elastomer, ethylene-propylene elastomer, ethylene-propylene diene elastomer, ethylene-acrylate ester or methacrylate ester copolymer or terpolymer, or any copolymer or combination thereof. The thermoplastic polymer may comprise a polyolefin, an ethylene copolymer, an ethylene terpolymer; ethylene-acrylic esters and ethylene-methacrylic esters; polystyrene; styrene copolymers and terpolymers; styrenic block copolymers; butyl rubber; acrylonitrile butadiene rubber; butadiene rubber; copolymers and terpolymers of butadiene; natural rubber; polyisoprene rubber; ethylene-propylene elastomers; polychloroprene; hydrogenated nitrile rubber (HNBR); silicones; polysulfide polymers; vinyl polymers; or any copolymer or combination thereof. Combinations are also contemplated. Neoprene® is the DuPont Performance Elastomers trade name for a family of synthetic rubbers based on polychloroprene.

In specific embodiments, the thermoplastic polymer comprises polyethylene, ethylene-vinyl acetate (EVA), polypropylene, ethylene-alpha olefin elastomer, ethylene-propylene elastomer, ethylene-propylene diene elastomer, or ethylene-acrylate ester or methacrylate ester copolymer or terpolymer.

Exemplary polyolefins suitable as the thermoplastic polymer include polyethylene commercially available as Attane™ and Dowlex™, manufactured by Dow, Petrothene™, manufactured by Equistar, Sabic™, manufactured by Sabic, Marlex™, manufactured by Chevron-Phillips, and Exceed™, manufactured by ExxonMobil; ethylene-alpha olefin elastomer commercially available as Engage™, manufactured by Dow, Exact™, manufactured by ExxonMobil and Tafmer™ and Evolue™, manufactured by Mitsui; or ethylene-propylene elastomer or ethylene-propylene diene elastomers commercially available as Vistalon™, manufactured by Exxon Mobil and Nordel™, manufactured by Dow; ethylene-acrylate ester or methacrylate ester copolymers and terpolymers commercially available as Elvaloy™, manufactured by DuPont, and Lotryl™, manufactured by Arkema; and butyl rubber, nitrite rubber, silicone elastomer, polyurethane elastomer, and styrene block copolymers commercially available as Kraton™, manufactured by Kraton, etc.

The first thermoplastic polymer is melt kneaded with a reactive moiety that comprises a first reactive group reactive towards the first thermoplastic polymer but not with a second polymer and a second reactive group reactive with the second polymer but not with the first polymer. The first reactive group reacts with at least one portion of the first thermoplastic polymer, grafting the second reactive group onto the first thermoplastic polymer. The second reactive group compatibilizes the first thermoplastic polymer with the second polymer, such that covalent bonds are obtained between portions of the first and second polymers so they can be blended together into a composition having improved properties relative to an un-compatibilized blend. The improved properties include better elongation to break, toughness, strength, surface quality, gloss, and chemical resistance.

Generally, the two reactive groups can be any reactive segment. In embodiments, the two reactive groups of the reactive moiety independently comprise a reactive segment selected from the group consisting of carboxyl, anhydride, oxirane, amino, ester, oxazoline, isocyanate, amido, hydroxyl, urethane, silyl, silanol, siloxane, vinyl-terminated silane, vinyl, allyl, acryl, methacryl, diene, and fumaryl. In other embodiments, the reactive segment is able to react with amine, amide, hydroxyl, carboxyl, anhydride, ester, urethane, urea, carbamate, oxirane, isocyanate, and oxazoline groups. In specific embodiments, only one reactive segment comprises at least one carbon-carbon double bond.

Furthermore, the reactive moiety has at least two different reactive groups which react with different polymers. In this regard, the two reactive groups are directed to the different reactive polymer segments.

Exemplary reactive moieties include, but are not limited to, maleic anhydride, glycidyl methacrylate (GMA), glycidyl acrylate, acrylic acid, methacrylic acid, ethylenically unsaturated carboxylic acid or acid derivative, such as an acid anhydride, an acid ester, an acid salt, amide, imide, or the like; maleic acid, fumaric acid, itaconic acid, citraconic acid, mesaconic acid, 4-methyl cyclohex-4-ene-1,2-dicarboxylic acid anhydride, bicyclo(2.2.2.)oct-5-ene-2,3-dicarboxylic acid anhydride, 1,2,3,4,5,8,9,10-octahydronaphthalene-2,3-dicarboxylic acid anhydride, 2-oxa-1, 3-diketo-spiro(4.4) non-7-ene, bicyclo(2.2.1)heptene-2,3-dicarboxylic acid anhydride, maleopimaric acid, tetrahydrophthalic anhydride, norborn-5-ene-2,3-dicarboxylic acid anhydride, nadic anhydride, methyl nadic anhydride, himic anhydride, methyl himic anhydride, and methylbicyclo(2.2.1)hept-5-ene-2,3-dicarboxylic acid anhydride.

The second reactive group of the reactive moiety is grafted to the first thermoplastic polymer by reaction between the first reactive group and the first thermoplastic polymer. The reaction mechanism may be by free radical, anionic, or cationic initiated grafting. In specific embodiments, a reaction initiator, reaction catalyst, or reaction accelerator may be added to promote the grafting of the first reactive group onto the first thermoplastic polymer. Suitable initiators can be selected based upon the type of reaction intended. For example, where the grafting reaction is between a reactive moiety containing a carbon-carbon double bond and a polyolefin thermoplastic polymer, a free radical initiator may be suitable. As another example, where the reactive group is an oxirane group, a cationic initiator may be suitable.

The second polymer is a polymer, preferably an engineering thermoplastic resin comprising a polyamide; polyester; polyurethane; or copolymers, block copolymers, blends or combinations thereof. In specific embodiments, the second polymer comprises a polyester; and semi aromatic polyester such as polyethyleneterephthalate (PET), polybutylene terephthalate (PBT), polyethylenenaphthanate (PEN), an aliphatic polyester; polycarbonate; a polyester elastomer; a polyamide; a polyphthalamide; a polyamide elastomer; a polyurethane; a polyimide; a polysulfone; a polyphenylene ether; a polyphenylene sulfide; a polysulfone; a liquid crystalline polymer (LCP); polyetheretherketone (PEEK); polyphenylsulfone; polyamide-imide; polyolefins, polyolefin copolymers and terpolymers; EVA; ethylene-acrylic ester and ethylene-methacrylic ester; polystyrene; styrene copolymers and terpolymers; styrenic block copolymers; butyl rubber; nitrile rubber; butadiene rubber; copolymers and terpolymers of butadiene; natural rubber; polyisoprene rubber; ethylene-propylene elastomer; polychloroprene; silicone polymer; polysulfide; a vinyl polymer; an acrylic polymer; a fluoropolymer copolymer; and blends or combinations thereof.

Exemplary engineering thermoplastics selected in a non-limiting manner from a group including, inter alia, polyamides, polyesters, and semi aromatic polyesters such as polyethyleneterephthalate (PET), polybutylene terephthalate (PBT), polyurethanes, polyester block amide, and combinations thereof. The polyamides may be aliphatic polyamides such as Polyamide 6, commercially available as Ultramid™, manufactured by BASF, Grilon™, manufactured by EMS-Grivory, and Akulon™, manufactured by DSM; Polyamide 66, commercially available as Ultramid™, manufactured by BASF, Polynil™, manufactured by Nilit, Grilon™, manufactured by EMS-Grivory and Akulon™, manufactured by DSM; polyamide 6-66 copolymer, polyamide 6T, polyamide 6-12, polyamide 11 and Polyamide 12, commercially available as Rilsan™, manufactured by Arkema; Polyamide 46 commercially available as Stanyl™, manufactured by DSM; and Polyether block amide (PEBA), copolymers and blends thereof. One important source for cost-effective polyamides is recycled polyamide fibers from the textile industry.

Exemplary polyesters include aromatic diacid-glycol based esters, such as polyethylene terephthalate (PET), polybutylene terephthalate (PBT), polyethylene napthanate (PEN), co-polyesters, copolymers and blends thereof. Commercially available products are Eastapak™ and Eastar™, manufactured by Eastman and Ultradur™ manufactured by BASF. Two suitable sources include (i) recycled PET beverage bottles, usually as regrind; and (ii) recycled fibers from the textile industry.

Exemplary polyurethanes are aliphatic and/or aromatic thermoplastic polyester-urethanes, polyether-urethane, copolymers and blends thereof. Aliphatic polyurethanes in particular have better resistance against UV light and thermal induced degradation. Commercially available polyurethanes include Pellethane™, manufactured by Dow; Estane™ and Tecothane™, manufactured by Noveon; and Desmopan™, manufactured by Bayer.

In specific embodiments, the second reactive group of the reactive moiety is reactive with one or more groups on the second polymer. In particular, the second reactive group can form covalent bonds with groups on the second polymer. It should also be noted that the reactive moiety need not be completely grafted upon the first and second polymers. Covalent bonds can be formed between at least one portion of the first thermoplastic polymer and at least one portion of the second polymer to form a hybrid chain. The hybrid chain structure compatibilizes the other unmodified chains and enables the dispersion of two immiscible polymers. The mechanism is similar to the way a surfactant emulsifies oil and water.

Several different additives may be included in the compatibilized polymeric composition of the present disclosure. Those additives include roving, chopped and milled fibers, whiskers, fillers, nanosize particles, pigments or dyes, UV absorbers, heat stabilizers, light stabilizers, HALS, hydrolysis inhibitors, lubricants, slip agents, antistatic agents, thermally conductive particles, electrically conductive particles, impact modifiers, gas bubbles, liquid droplets, corrosion inhibitors, processing aids, plasticizers, blowing and/or foaming agents, additional unmodified polymer, and external compatibilizer.

One possible additive is roving. Fibers used as roving or short fibers may have a diameter from about 1 micron to about 1000 microns, and a length from about 5 microns to continuous roving having a length equal to the product length. Roving has a fiber length of 10 mm or greater. Short fibers have a length of 10 mm or less. Thus, the roving length may exceed hundreds of meters if a continuous strip or filament is manufactured. Whiskers may have a diameter from about 0.1 micron to about 100 microns. The fibers may be in the form of discrete fibers, bundles, bonded bundles and twisted filaments, or combinations thereof. Fibers may be monolithic or multilayer. In the case of multilayer fibers, the outer layer(s) may be electrically conductive. Exemplary fibers provided as roving or short fibers include glass fibers manufactured by Vetrotex; carbon fibers such as Gronoc™, manufactured by Nippon Graphite Fiber Corporation; Aramid fibers such as Kevlar™, manufactured by DuPont, and Technora™ manufactured by Teijin; electrically conductive fibers such as boron and stainless metal fibers; nickel coated glass fibers; and natural fibers such as fibers derived from plants—for example, kenaf, flax, hemp, jute, ramie and sisal.

A filler may also be added. A filler is any solid material that is not melted or dissolved in the molten polymeric blend, and having average particle size of lower than 50 micrometers. In embodiments, the filler comprises a material selected from the group consisting of a metal oxide, a metal carbonate, a metal sulfate, a metal phosphate, a metal silicate, a metal borate, a metal hydroxide, a silica, a silicate, an aluminate, an alumo-silicate, chalk, talc, dolomite, an organic or inorganic fiber or whisker, saw dust, wood flour, milled natural fibers, newsprint, a metal powder, metal-coated inorganic particles, clay, kaolin, industrial ash, concrete powder, cement, wollastonite, and combinations thereof. The filler may have an average particle diameter lower than 50 microns, more preferably lower than 30 microns, and most preferably lower than 10 microns. The filler may be surface treated. In specific embodiments, the surface treatment is selected from organic acid, organic esters, organic amides, organo-silanes, organo-titanates and organo-zirconates.

Nanosize particles may be added. The particles are inorganic particles and may have barrier properties. The term "barrier properties" refers to the ability of the particles to (1) reduce the rate of diffusion of additives from the polymeric composition into its surrounding environment; (2) reduce the rate of diffusion of hydrolyzing agents such as water, protons and hydroxyl ions from the surrounding environment into the polymeric composition; and/or (3) reduce the production/mobility of free radicals and/or ozone inside the polymeric composition. Nanoparticles are from about 5 to about 100 nanometers in average diameter. In specific embodiments, the nanosize particles comprise a material selected from the group consisting of clay; silica; silicates; alumosilicates; zinc oxide; titanium oxides; zirconium oxides; talc; nanotubes; metal particles and/or flakes; carbon black; sulfides and sulfates; plant or animal originated cellulose, lignin, or proteins; and combinations thereof.

Additional unmodified polymer may also be added in some embodiments.

UV absorbers may be added. Organic UV absorbers include benzotriazoles or benzophenones commercially available as, for example, Tinuvin™, manufactured by Ciba, and Cyasorb™, manufactured by Cytec. Inorganic UV absorbers include particles made from materials such as titanium salts, titanium oxides, zinc oxides, zinc halides, and zinc salts, and in particular titanium dioxide. Examples of commercially available inorganic UV absorbers are SACHTLEBEN™ Hombitec RM 130F TN, by Sachtleben, ZANO™ zinc oxide by Umicore, NanoZ™ zinc oxide by Advanced Nanotechnology Limited and AdNano Zinc Oxide™ by Degussa. A hindered amine light stabilizer (HALS) is a molecule which provides long term protection against free radicals and light-initiated degradation. In particular, HALS does not contain phenolic groups.

An external compatibilizer may also be added. Use of an external compatibilizer is not necessary, but may be useful in certain applications and/or in adjusting the properties of the compatibilized polymeric composition. It should be recognized that the self-compatibilizer may be similar to or even the same as various known materials which may be synthesized separately or commercially obtained. However, in those cases the materials would be referred to as an external compatibilizer. Thus, the self-compatibilizer and the external compatibilizer may both be referred to as a functionalized polymer or oligomer.

In specific embodiments, the functionalized polymer or oligomer is selected from (i) modified polymers and (ii) copolymers and terpolymers. Modified polymers may have pendant first reactive groups and/or terminal first reactive groups, the first reactive groups being in a non limiting manner from carboxyl, anhydride, oxirane, amino, ester, oxazoline, isocyanate, and combinations thereof.

Exemplary embodiments of functionalized polymers or oligomers include a maleic anhydride grafted polyethylene; a maleic anhydride grafted ethylene-acrylic or methacrylic ester copolymer or terpolymer; a maleic anhydride grafted propylene homopolymer or copolymer; a maleic anhydride grafted ethylene-alpha olefin polymer; a maleic anhydride grafted ethylene-propylene rubber; a glycidyl methacrylate or acrylate (GMA) grafted polyethylene; a GMA grafted ethylene-acrylic or methacrylic ester co-polymer or terpolymer; a GMA grafted propylene homopolymer or copolymer; a GMA grafted ethylene-alpha olefin polymer; a GMA grafted ethylene-propylene rubber; an acrylic or methacrylic acid grafted ethylene copolymer or terpolymer; an acrylic and methacrylic acid ionomer: a styrene-maleic anhydride copolymer or terpolymer; a styrene-acrylic acid or styrene-methacrylic acid copolymer or terpolymer: a copolymer or terpolymer of ethylene-glycidyl methacrylate or ethylene-glycidyl acrylate; and combinations thereof.

Examples of commercially available functionalized polymers or oligomers, useful as an external compatibilizer include Lotader™, manufactured by Arkema; Bondyram™, manufactured by Polyram; Polybond™, manufactured by Crompton; Integrate™, manufactured by Equistar; Yparex™, manufactured by DSM; Primacor™ and Amplify™, manufactured by Dow; Epolene™, manufactured by Eastman; Escor™, Optema™ and Exxelor™, manufactured by ExxonMobil; Fusabond™, Bynel™, Elvaloy™ and Surlyn™, manufactured by DuPont; A-C™ modified polyolefins, manufactured by Honeywell; Modic-AP™, manufactured by Mitsubishi; Admer™, manufactured by Mitsui; Modiper™, manufactured by NOF; and Igetabond™, manufactured by Sumitomo.

In one embodiment, the functionalized polymer is a copolymer or terpolymer comprising an unsaturated monomer and a functional unsaturated monomer. The functional unsaturated monomer includes an unsaturated group and a first reactive group selected from carboxyl, anhydride, oxirane, amino, ester, oxazoline, isocyanate, and combinations thereof. For example, the copolymer may be styrene maleic anhydride copolymers and terpolymers, such as SMA™ resins, manufactured by Sartomer, UMG AXS™, manufactured by UMG, Synthacryl™, manufactured by UCB resins and others.

The external compatibilizer can be a copolymer or terpolymer provided by gas phase, emulsion phase, liquid phase or solid phase polymerization, for example styrene maleic anhydride copolymer, or ethylene-acrylic acid ester-glycidyl methacrylate terpolymer. The external compatibilizer can be provided in any shape, such as solid pellets, powder, liquid, solution, flakes, or as melt from a melt kneading apparatus. The external compatibilizer may be the product of either reactive extrusion or a reactor.

The various steps in the process of the present disclosure may be performed in several different manners. In one embodiment, the second polymer is provided to the first apparatus from a second apparatus directly into an aperture in the downstream portion of the first apparatus. The second apparatus may be an extruder. The second apparatus may also be a batch mixer. In another embodiment, a melt pump mediates the flow of polymer from the second apparatus to the first apparatus.

In other embodiments, the additive(s) to the self compatibilizer and second polymer is provided directly to the first or second melt kneading apparatus from a feed port, an injection aperture or a coupled extruder.

In one specific embodiment, a polyolefin and a reactive moiety are fed to a first extruder and melt kneaded to form a self-compatibilizer. A molten second polymer is provided from a second extruder, coupled to the first extruder directly or via a melt pump. The two polymers are melt kneaded together in the first extruder or in a third extruder. Volatile matter may be removed by means of a vent—at atmospheric pressure and/or under an applied vacuum. Optionally, roving, filler, short fibers, and/or long fibers are provided via an aperture in any of the extruders, usually close to the die. Filler and short fibers may be provided by means of a side feeder and roving may be provided from a spool. Long fibers provide additional stiffness, strength, impact strength, and fatigue resistance to the compatibilized blend. Continuous long fibers provide the greatest stiffness, strength, impact strength, and fatigue resistance to the compatibilized blend. Other additives such as colorants, blowing agents, heat stabilizers and/or light stabilizers, processing aids, tougheners, and plasticizers may be introduced from any aperture in any of the melt kneading apparatuses (preferably extruders), in the form of pellets, powder, flakes, liquid, liquid or compressed gas, or slurry. In embodiments, the additive is provided in a molten state, a solid state, a liquid state, in a gaseous state, or in solution, emulsion, or dispersion in a suitable solvent.

Figure 1:
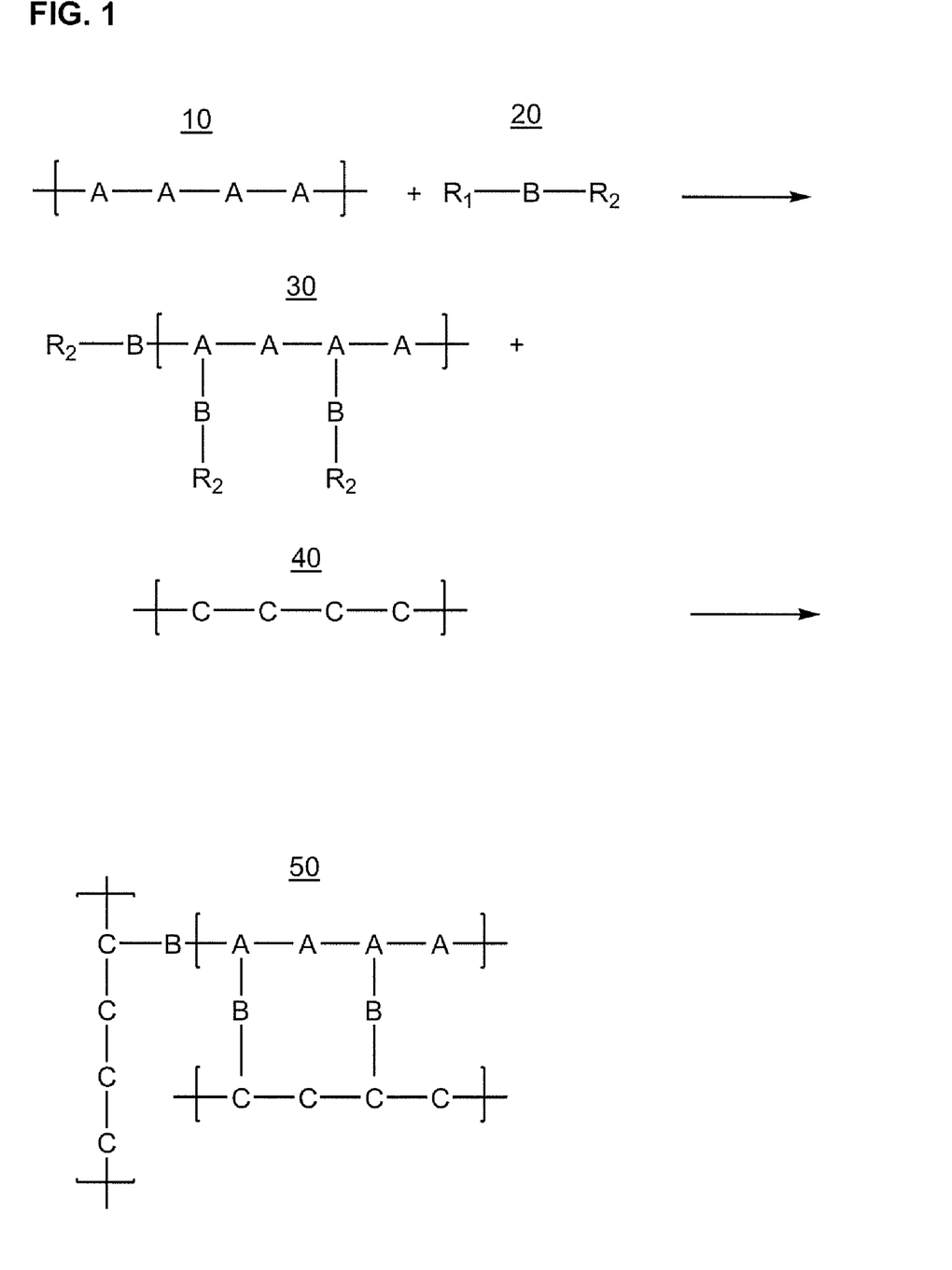
FIG. 1 shows the general chemical reactions that occur during the processes of the embodiments of the present disclosure.

FIG. 1 shows the chemical reactions that occur as the processes of the embodiments of the present disclosure are carried out. An unmodified first thermoplastic polymer 10 is provided. Here, for simplicity, the first thermoplastic polymer is shown as comprising monomer A, though it may comprise other monomers. A reactive moiety 20 has two reactive groups $R_1$ and $R_2$ which are joined by divalent linkage B. When the first thermoplastic polymer 10 is melt kneaded with the reactive moiety 10, the first reactive group $R_1$ reacts with at least a portion of the first polymer 10 to graft the second reactive group $R_2$ to the first polymer 10. The reactive moiety 20 may be grafted as either a pendant group or a terminal group, as shown in self-compatibilizer 30. $R_1$ becomes the covalent bond between monomer A and the reactive moiety. Note that divalent linkage B is considered a representative placeholder and does not have a specific constant chemical structure. For example, the reactive moiety may be maleic anhydride. Once reacted, the atoms and bonds represented by divalent linkage B differ from when they were in the anhydride form.

The self-compatibilizer 30 is then melt kneaded with second polymer 40, which is shown here, for simplicity, as consisting of monomer C. Of course, the second polymer 40 may comprise other monomers. The second reactive group $R_2$ reacts with at least a portion of second polymer 40 to graft the self compatibilizer 30 with the second polymer 40. The result is a compatibilized polymeric composition 50.

Figure 2:
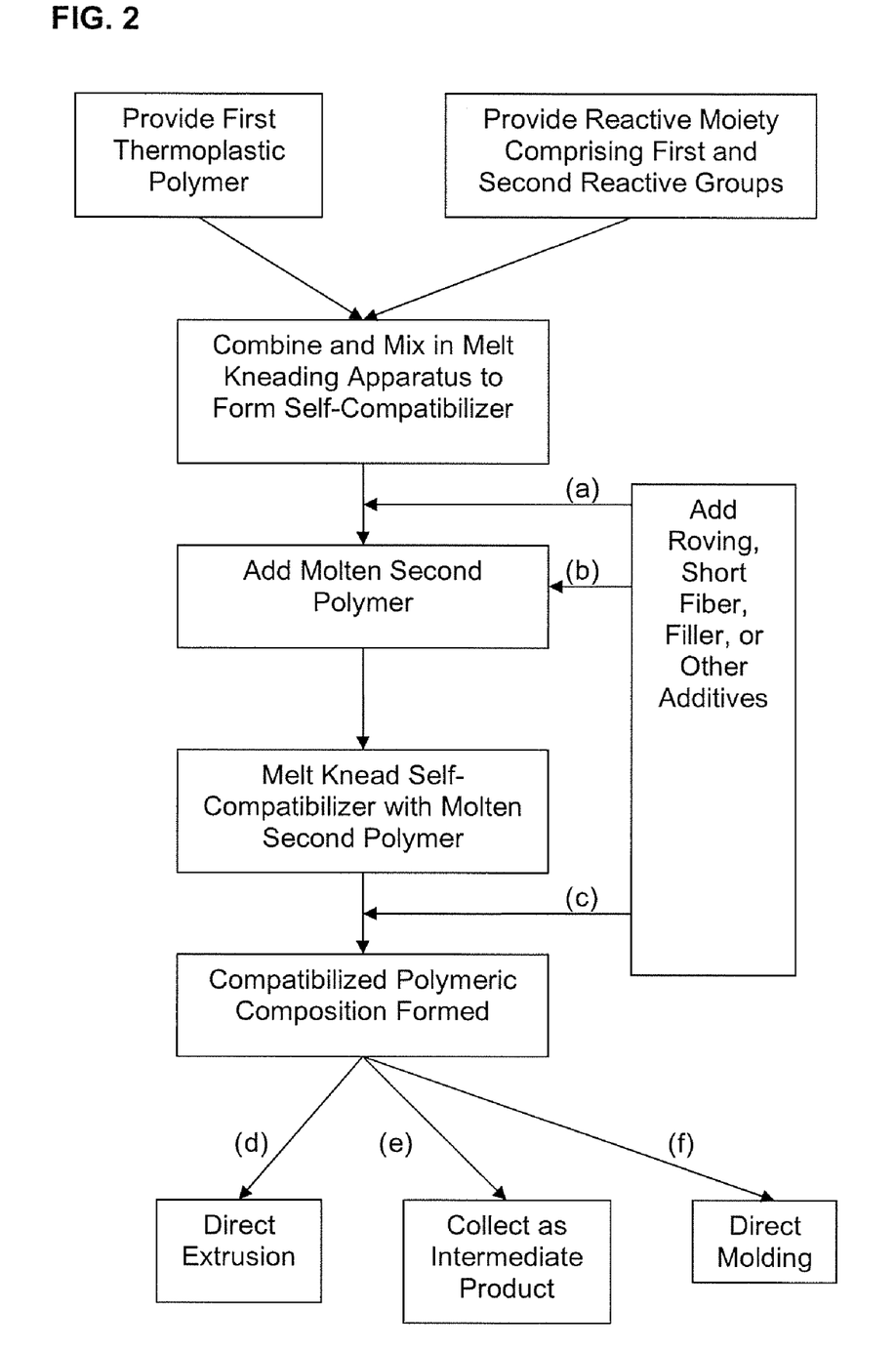
FIG. 2 is a process flow diagram illustrating the general steps of the various processes in accordance with the embodiments of the present disclosure.

FIG. 2 is a process flow diagram illustrating various embodiments of processes according to the present disclosure. A first thermoplastic polymer is provided. A reactive moiety is also provided, the reactive moiety comprising at least one first reactive group capable of reacting with the first thermoplastic polymer but not a second polymer which is to be subsequently provided and a second reactive group capable of reacting with the second polymer but not the first thermoplastic polymer. An initiator and or catalyst may also be provided if needed. These ingredients are combined in a melt kneading apparatus and melt kneaded to form a self-compatibilizer. They are melt kneaded for enough time so that the first reactive group reacts with the first polymer, usually between about 2 seconds and about 2 minutes. The second reactive group does not react with the first polymer. In some embodiments, no initiator is required because free radicals are generated due to shear melt in the melt kneading apparatus.

Once the self-compatibilizer is formed, the process may vary depending on whether and when any additives are provided and added to the polymer mixture. Additives can be provided from a side feeder. If powder or short fibers are introduced, a forced feeder (usually a screw that pushes the additive towards the molten polymer) may be used or they may be fed gravimetrically. If the additive is a liquid, pressurized gas, solution, dispersion, or emulsion, high-pressure injection through a nozzle may be used.

A molten second polymer is provided to the melt kneading apparatus and is melt kneaded together with the self-compatibilizer to form a compatibilized polymeric composition. The grafted second reactive group reacts with the second polymer to form hybrid chains that compatibilize the unmodified chains. In embodiments, the molten second polymer is provided from an extruder that is coupled to the first extruder. The two extruders may be directly coupled or the coupling may be done by a dedicated melt pump or accumulator. The second polymer may be an polyolefin, styrenic, silicone, polyester, polyamide, polyurethane, polycarbonate, as well as a mixture, blend, or alloy of more than one polymer. In some embodiments, the second polymer comprises an engineering thermoplastic resin. An engineering thermoplastic resin is any polymer characterized by a tensile modulus of elasticity greater than 1.5 MPa and tensile strength greater than 25 MPa. The second polymer may also be melt kneaded by a batch apparatus and pumped to the first apparatus by means of an extruder or a melt pump. In any case, the second polymer is provided to the melt kneading apparatus in a molten state, and the process of forming the compatibilized polymeric composition proceeds to completion without intermediate cooling and remelting steps.

In this way, the process of the present disclosure provides a compatibilized polymeric composition in a much more efficient and less costly process than has been heretofore possible. Products made from the compatibilized polymeric composition have less tendency to yellow and better toughness due to less thermal history compared to a multi-step process. Another advantage of the novel process is the ability to form compatibilized blends comprising heat sensitive polymers and additives, since the residence time of the second polymer and any additives is adjustable and may vary from a few minutes to only a few seconds. Another advantage is the ability to melt knead low fraction (lower than 45% by weight) of higher melting point polymer in lower melting polymer. This can not be obtained by current melt kneading technology, since the higher melting point polymer will not be molten if melt kneaded from dry blend with the lower melting point polymer.

A preferred embodiment of high melting polymers is polyethyleneterephthalate (PET), polybutylene terephthalate (PBT), polyamide 6 and 66 and polyphthalamide. A preferred embodiment of low melting polymers are polyethylene and copolymers and terpolymers of ethylene, polypropylene and styrenic polymers, copolymers and terpolymers such as polystyrene and styrene-butadiene-acrylonitrile (ABS).

As shown by arrows (a), (b), and (c), the additives can be added prior to or simultaneously with the molten second polymer being combined with the self-compatibilizer. The additives may also be added after the self-compatibilizer and second polymer have been melt kneaded.

The compatibilized polymeric composition can be further processed in at least three ways. As shown by arrow (d), the compatibilized polymeric composition may be provided to a direct extrusion process in which extruded products may be produced without intermediate cooling and remelting steps. For example, such products may include a tube, a pipe, a profile, a beam, a sheet, a film, a strand, a filament, etc. As shown by arrow (e), the compatibilized polymeric composition may be formed into and collected as an intermediate product, such as pellets, granules, flakes or powder, for later use. As shown by arrow (f), the compatibilized polymeric composition may be provided to a direct molding process for produced molded articles. The molding process may include blow molding, compression molding, transfer molding, injection molding, sheet extrusion followed by compression molding, calendaring, or any other molding process known in the art.

Figure 3:
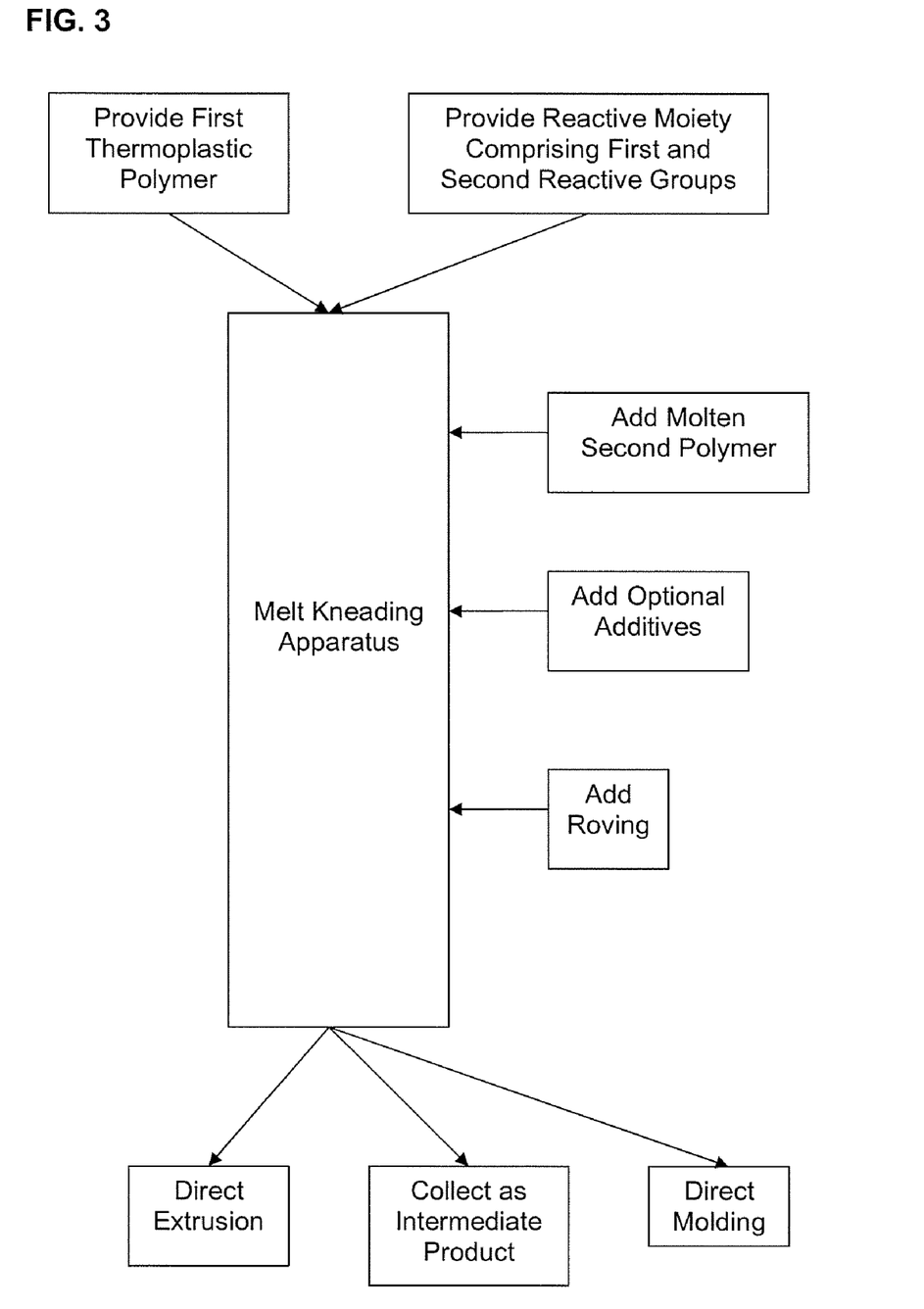
FIG. 3 is a schematic process flow diagram illustrating a process in accordance with an embodiment of the present disclosure.

FIG. 3 is a schematic process flow diagram illustrating an exemplary process of the present disclosure. Here, the entire process is carried out in a single continuous, progressive melt kneading apparatus, although components may be fed from other apparatus. First, the unmodified first thermoplastic polymer and the reactive moiety are melt kneaded under conditions such that the reactive moiety is grafted onto the first thermoplastic polymer, forming a self-compatibilizer. In a downstream portion of the same melt kneading apparatus, at least one molten second polymer is fed into the melt kneading apparatus combined with the newly formed self-compatibilizer. The second polymer may be a rigid polymer such as an engineering thermoplastic (engineering thermoplastic) resin. The process further includes the addition of roving. The roving may comprise, e.g., long fibers of glass, carbon, aramid, metal, ceramic, natural (originated from plants or animals), or polymeric materials. These ingredients are wetted and melt kneaded to form a reinforced compatibilized polymeric composition.

Figure 4:
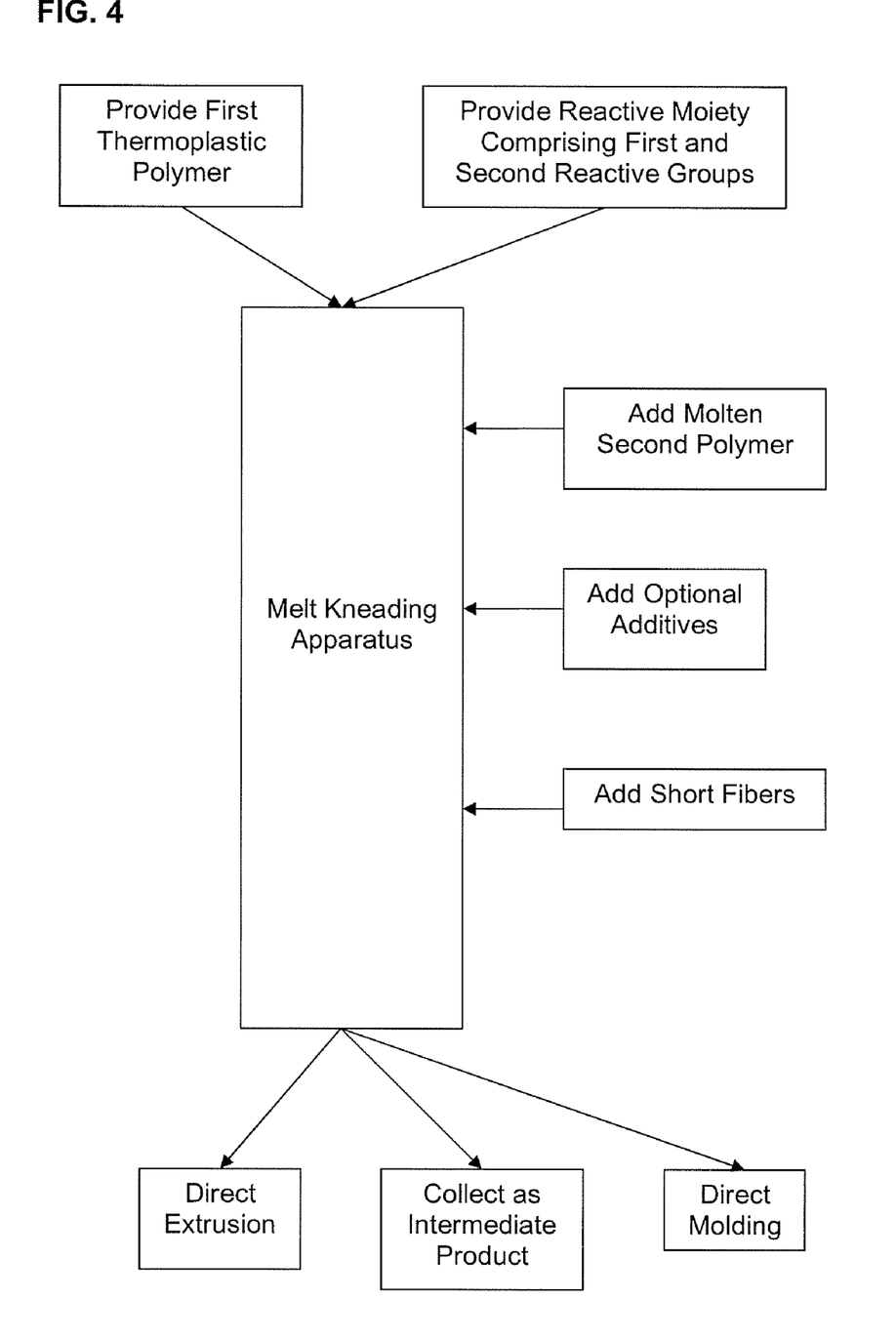
FIG. 4 is a schematic process flow diagram illustrating a process in accordance with another embodiment of the present disclosure.

FIG. 4 is a schematic process flow diagram illustrating another exemplary process of the present disclosure. FIG. 3 differs from FIG. 2 in that instead of roving, the process includes the addition of short fibers such as glass fibers, ceramic fibers, natural fibers, aramid fibers, mineral fiber, metal fiber, and carbon fibers, with the mixture of self-compatibilizer and second polymer.

Figure 5:
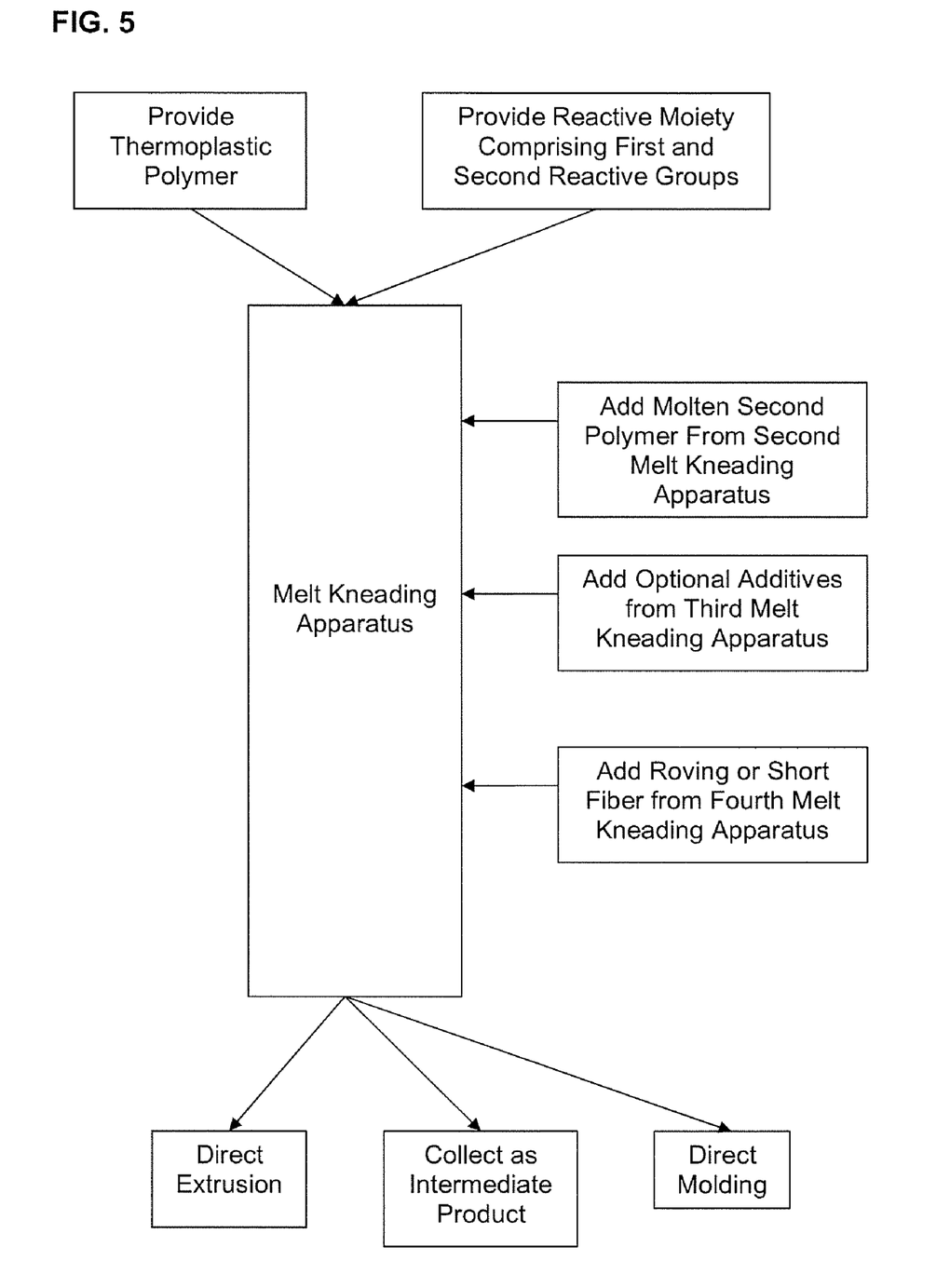
FIG. 5 is a schematic process flow diagram illustrating a process in accordance with still another embodiment of the present disclosure.
Figure 6:
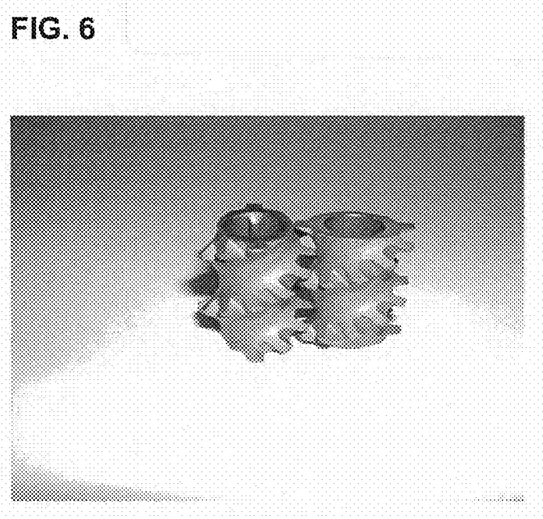
FIG. 6 is an exemplary screw which can be used in a machine used in the processes of the present disclosure.
Figure 7:
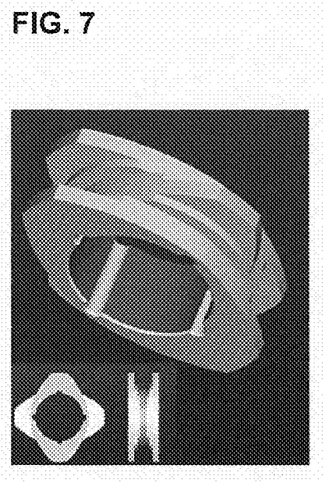
FIG. 7 is an exemplary screw which can be used in a machine used in the processes of the present disclosure.
Figure 8:
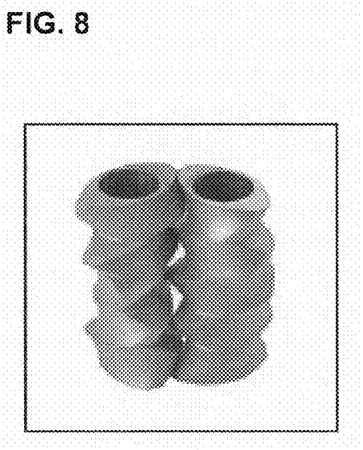
FIG. 8 is an exemplary screw which can be used in a machine used in the processes of the present disclosure.
Figure 9:
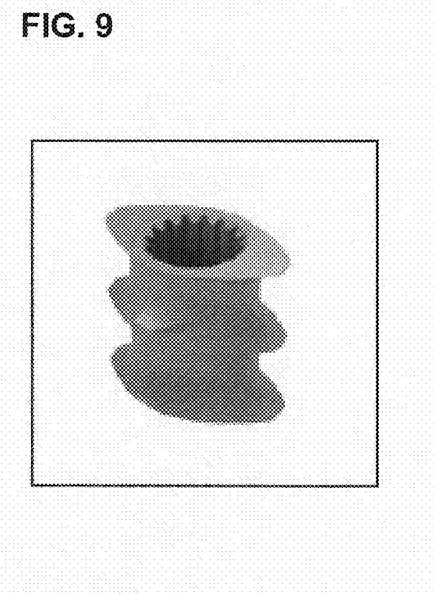
FIG. 9 is an exemplary screw which can be used in a machine used in the processes of the present disclosure.
Figure 10:
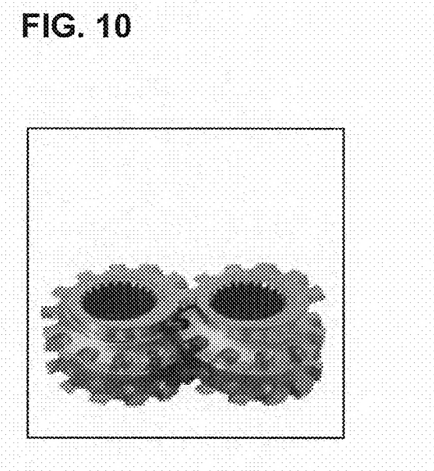
FIG. 10 is an exemplary screw which can be used in a machine used in the processes of the present disclosure.
Figure 11:
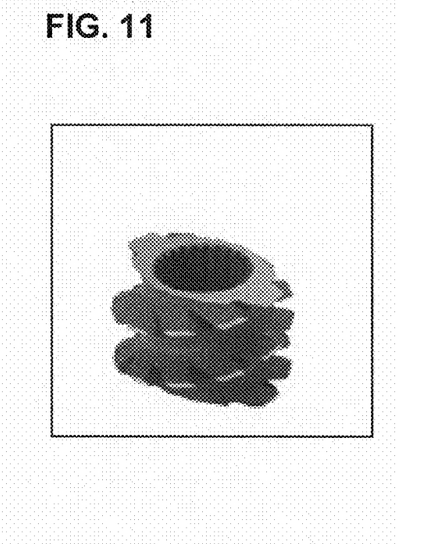
FIG. 11 is an exemplary screw which can be used in a machine used in the processes of the present disclosure.
Figure 12:
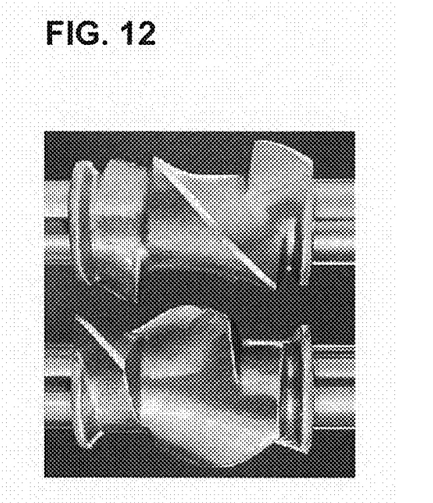
FIG. 12 is an exemplary screw which can be used in a machine used in the processes of the present disclosure.
Figure 13:
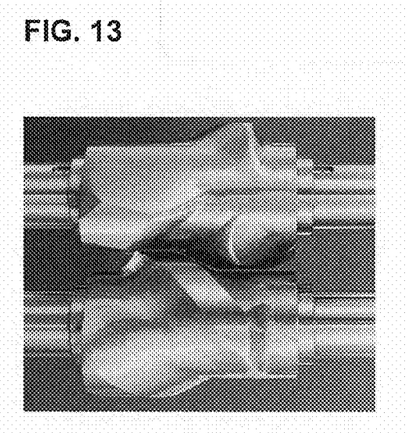
FIG. 13 is an exemplary screw which can be used in a machine used in the processes of the present disclosure.
Figure 14:
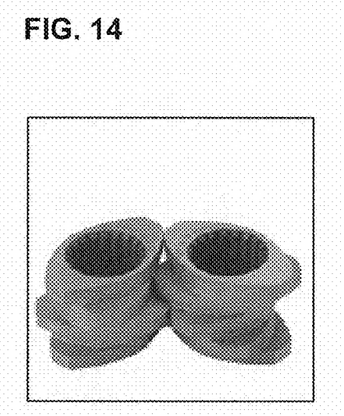
FIG. 14 is an exemplary screw which can be used in a machine used in the processes of the present disclosure.
Figure 15:
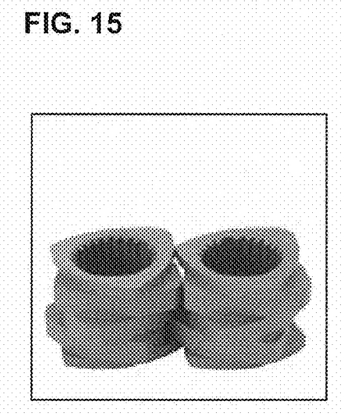
FIG. 15 is an exemplary screw which can be used in a machine used in the processes of the present disclosure.

FIG. 5 is a schematic process flow diagram illustrating yet another exemplary process of the present disclosure. FIG. 4 differs from FIG. 2 in that the molten second polymer, optional ingredients, and roving are each provided as a product of another melt kneading apparatus. In particular, the roving may be combined with a suitable carrier, such as a polymer, solvent, dispersion, slurry, or other material which can be handled in a melt kneading apparatus.

In embodiments, the continuous, progressive melt kneading apparatus is an extruder. The extruder may be a single-screw extruder or a multiple-screw extruder, and in specific embodiments is a twin-screw extruder. The melt kneading apparatus should provide shear adequate to result in thorough and complete mixing of the polymers and other additives provided to the apparatus. In other specific embodiments, the melt kneading apparatus applies force to the components of the composition such that the components are mixed, dispersed, distributed, melted, softened, heated, ground, or reduced in particle size. In additional embodiments, at least one melt kneading apparatus is a multi-screw extruder, internal mixer, or a co-kneader.

In specific embodiments, the polymeric compatibilized composition is melt kneaded in an apparatus having screws or shafts characterized by high distributive mixing. Exemplary screws or shafts which provide high distributive mixing are shown in FIGS. 6-15. In specific embodiments, at least 5% of the screw length of at least one melt kneading apparatus uses the screw shown in FIG. 6. In specific embodiments, at least 5% of the screw length of at least one melt kneading apparatus uses the screw shown in FIG. 7. In specific embodiments, at least 5% of the screw length of at least one melt kneading apparatus uses the screw shown in FIG. 8. In specific embodiments, at least 5% of the screw length of at least one melt kneading apparatus uses the screw shown in FIG. 9. In specific embodiments, at least 5% of the screw length of at least one melt kneading apparatus uses the screw shown in FIG. 10. In specific embodiments, at least 5% of the screw length of at least one melt kneading apparatus uses the screw shown in FIG. 11. In specific embodiments, at least 5% of the screw length of at least one melt kneading apparatus uses the screw shown in FIG. 12. In specific embodiments, at least 5% of the screw length of at least one melt kneading apparatus uses the screw shown in FIG. 13. In specific embodiments, at least 5% of the screw length of at least one melt kneading apparatus uses the screw shown in FIG. 14. In specific embodiments, at least 5% of the screw length of at least one melt kneading apparatus uses the screw shown in FIG. 15. There are advantages to providing the second polymer in a molten state. If the second polymer is added as a solid, it is difficult to melt because most of the melting energy in melt kneaders is produced by friction between the solid second polymer and the shaft or barrel of the kneader. Thus, the second polymer does not evenly disperse in the blend, and in some cases it may remain in solid form. By providing the second polymer to the first melt kneading apparatus in molten form, this problem is overcome. Of course, other additives, such as fillers, fibers, and roving are solids and will remain as solids in the compatibilized polymeric composition. In some embodiments, the second polymer is provided to the first melt kneading apparatus from a second melt kneading apparatus. This increases efficiency because there is no need to remelt the second polymer or increase the residence time of the mixture.

In some embodiments, all ingredients are provided to the first melt kneading apparatus in a molten form or dispersed in a molten polymer, where such ingredients are not susceptible to melting at the relevant temperatures at which the melt kneading apparatuses are operated.

In specific embodiments, roving is added after the molten second polymer is mixed with the self-compatibilizer. This enables enough residence time and mixing to wet the fibers with minimal degradation of fiber length.

As shown in FIG. 1, the compatibilized polymeric composition may be directly provided to a direct extrusion process or to a direct molding process or it may be collected as an intermediate product. In some embodiments, the polymeric composition is extruded from a die in the melt kneading apparatus to form one or more of pellets, granules, flakes or powder. When the polymeric composition is provided to a direct extrusion process or to a direct molding process, the molten polymeric composition is transferred directly as melt from the first melt kneading apparatus to the extrusion or molding apparatus or tool. In particular embodiments, the polymeric composition is transferred in a molten state, without an intermediate step of first converting it into a solid state. Thus, there is no need to first cool and solidify the product and then to remelt it later. The direct extrusion process may be used to form a profile, a tube, a pipe, a sheet, a film, a strand or a filament, or any other extruded product of the compatibilized polymeric composition. When the polymeric composition contains roving, the extrusion process may be in the form of a pultrusion or a pushtrusion process, wherein the roving is involved directly in the extrusion. The roving may remain intact along the entire extruded article or be cut to a pre-defined size by the kneader or die. In further embodiments where the polymeric composition is provided to a direct molding process, a final molded product is obtained from the molding process and the process may include a step of blow molding, injection molding, transfer molding, compression molding, low-pressure injection molding, injection-compression molding, or sheet extrusion followed by compression molding. The direct molding process may be used to form any shape.

Several products may be formed using the processes of the present disclosure. Such products include a reinforcing membrane, tendons, ligaments, strips, bars, lumbers, beams, decking, concrete reinforcing elements, soil reinforcing elements geomembrane, geo-grid, cellular confinement system (CCS), sport goods, bicycles and motorcycles, medical devices, printed circuit boards, telecommunication packaging devices, pipes, valves, fuel systems, hazardous materials packaging and transportation, textiles, composite materials and structures, military lightweight structural elements, ballistic elements, automotive parts, and structural parts.

The present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLES

Example 1

100 kg of polyethylene resin Dowlex™ 2344, manufactured by Dow, 50 grams dicumyl peroxide (0.05% of the polyethylene weight), and 500 grams maleic anhydride (0.5% of the polyethylene weight) were dry blended. The mixture was fed into the main hopper of a first co-rotating twin screw extruder having a length to diameter ratio (L/D) of 60 at a rate of 100 kg/hr. A first side aperture was located halfway down the length of the extruder (where the L/D is about 30) and a second co-rotating twin screw extruder having L/D of 16 was mounted to the first side aperture; the two extruders were coupled by a melt pump. Both extruders were operated at 100-200 RPM screw speed. The first extruder was operated at 180-250° C., and the second extruder was operated at 230-280° C.

50 kg of Ultramid™ B50L 01 polyamide 6 resin was provided at a rate of 50 kg/hr and melt kneaded first in the second extruder. The molten polyamide 6 resin was then fed by the melt pump to the first extruder and melt kneaded with the functionalized polyethylene resin provided from the first sector of the first extruder. The melt kneading occurred along about 6-12 L/D downstream from the first side aperture (the entrance point of the polyamide 6 resin). At about 36-45 L/D from the main hopper of the first extruder, a second side aperture was provided and equipped with a side feeder, powder dozing unit, and atmospheric vent. 50 kg of Talc Iotalk Superfine™, manufactured by Yokal, 550 grams of Tinuvin™ 111 HALS mixture, and 550 grams of Tinuvin™ 234 low volatility benzotriazole UV absorber, both manufactured by Ciba, were fed together from the side feeder at a rate of about 51 kg/hr and melt kneaded with the compatibilized blend in the last portion of the first extruder. A vacuum vent along the last quarter of the first extruder was used to remove volatile byproducts. The resulting compound was extruded through a die, pelletized by a strand pelletizer, and dried at 45° C.

The resulting product, referred to hereinafter as CB.1, was extruded as a strip 1.5 mm thick and 100 mm wide.

Example 2

For comparison, a compatibilized blend was made in a two-step process.

Step 1: Functionalizing the Polyethylene 100 kg of polyethylene resin Dowlex™ 2344, manufactured by Dow, 50 grams dicumyl peroxide (0.05% of the PE weight), and 500 grams maleic anhydride (0.5% of the PE weight) were dry blended. The mixture was fed into the main hopper of a first co-rotating twin screw extruder having a length to diameter ratio (L/D) of 40 at rate of 100 kg/hr. The extruder was operated at 100-200 RPM screw speed and a barrels temperature of 180-250° C. A vacuum vent along the last quarter of the first extruder was used to remove volatile byproducts. The resulting compound was extruded through a die, pelletized by a strand pelletizer, and dried at 45° C.

Step 2: Melt Kneading to Form Compatibilized Blend

The pellets of step 1 were dry blended with 50 Kg of Ultramid™ B50L01 polyamide 6. The mixture was then fed at a rate of 150 kg/hr to the first extruder of step 1, operated at 100-200 RPM screw speed and a barrels temperature of 230-280° C. At about 25-35 L/D from the main hopper of the first extruder, a side aperture was provided and equipped with a side feeder, powder dozing unit, and atmospheric vent. 50 kg of Talc Iotalk Superfine™, manufactured by Yokal, 550 grams of Tinuvin™ 111 HALS mixture, and 550 grams of Tinuvin™ 234 low volatility benzotriazole UV absorber, both manufactured by Ciba, were fed from the side feeder at a rate of about 51 kg/hr and melt kneaded with the compatibilized blend in the last portion of the first extruder. A vacuum vent along the last quarter of the extruder was used to remove volatile byproducts. The resulting compound was extruded through a die, pelletized by a strand pelletizer, and dried at 45° C. The resulting product, referred to hereinafter as CB.2, was extruded as a strip 1.5 mm thick and 100 mm wide.

Evaluation

Tensile strength, modulus and creep modulus were measured 1 week after extrusion (referred to hereinafter as T.0) and after exposure for 60 days, in an aqueous solution having pH=6 at 45° C. (referred to hereinafter as T.60). Surface gloss and chalking were measured after 10,000 hours in QUV (QUV/Spray method, UVA-340 Lamp).

Two strips, each 100 mm width, were welded by ultrasonic sonotrode at 20 MHz. Ultimate weld strength was measured 48 hours after welding, and is referred to hereinafter as UWS.

A pair of strips of 100 mm length each were welded (weld width 100 mm), and ten welded couples were loaded by an 88 Kg load for a period of 30 days. The percentage of welded couples surviving intact is referred to hereinafter as % WCS88.

The resistance against organic fluids was evaluated by immersion for 60 days in Diesel fuel, and calculating the resultant weight gain.

The results are summarized in TABLE 1.

TABLE 1

Comparative Study of Durability of Blends

| Property | Example 1 | Example 2 |
|---|---|---|
| Color | White | Yellow-white |
| Notched Izod impact (J/m$^2$) | 950 | 650 |
| Tensile strength (MPa) @ T.0 | 43 | 40 |
| Tensile modulus (MPa) @ T.0 | 2600 | 2600 |
| Tensile elongation to break (%) @ T.0 | 220 | 200 |
| Tensile strength (MPa) @ T.60 | 40 | 38 |
| Tensile modulus (MPa) @ T.60 | 2400 | 2400 |
| Tensile elongation to break (%) @ T.60 | 280 | 220 |

TABLE 1-continued

Comparative Study of Durability of Blends

| Property | Example 1 | Example 2 |
|---|---|---|
| Surface properties (visual) after 10,000 hours in QUV | Slight loss of gloss, no cracks | Slight loss of gloss, no cracks |
| UWS (N) | 2153 | 2100 |
| % WCS88 (%) | 90 | 90 |
| % weight gain in Diesel fuel (60 days @ 45° C.) | 4 | 4 |

Table 1 demonstrates the efficiency of a process of the present disclosure in obtaining comparable if not better, compatibilized blends, relative to the known process of first functionalizing the polyolefin, then melt kneading with an engineering thermoplastic. The processes of the present disclosure save about 30% energy relative to a two-step process and provide less degradation of the polymers due to reduced thermal history, as evident from the color and impact strength data.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

Example 3

100 kg of polyethylene (PE) resin YUCLAIR™ PI500, manufactured by SK, 50 grams LUPEROX 101 peroxide manufactured by Arkema (0.05% of the polyethylene weight), and 1.5 kilograms Glycydil Methacrylate (GMA) (1.5% of the polyethylene weight) were dry blended. 5 kilograms talc was mixed with the blend, to absorb and immobilize the GMA on PE pellets. The mixture was fed into the main hopper of a first co-rotating twin screw extruder having a length to diameter ratio (L/D) of 48 at a rate of 60 kg/hr. A first side aperture was located halfway down the length of the extruder (where the L/D is about 24) and a second co-rotating twin screw extruder having L/D of 16 was mounted to the first side aperture. Both extruders were operated at 50-200 RPM screw speed. The first extruder was operated at 180-220° C. at the first half and 265-290 at the second half, and the second extruder was operated at 265-290° C.

30 kg of shredded Polyethyleneterephthalate (PET) beverage bottles (the PET was pre-dried to 0.01% humidity content prior to extrusion) resin was provided at a rate of 20 kg/hr and melt kneaded first in the second extruder. The molten PET resin was then fed to the first extruder and melt kneaded with the functionalized polyethylene resin provided from the first sector of the first extruder. The melt kneading occurred along about 6-12 L/D downstream from the first side aperture (the entrance point of the molten PET resin). At about 36-45 L/D from the main hopper of the first extruder, a second side aperture was provided and equipped with a side feeder, powder dozing unit, and atmospheric vent. 15 kg mixture of Talc Iotalk Superfine™, manufactured by Yokal, 550 grams of Tinuvin™ 111 HALS mixture, and 550 grams of Tinuvin™ 234 low volatility benzotriazole UV absorber, both manufactured by Ciba, were fed together from the side feeder at a rate of about 16 kg/hr and melt kneaded with the compatibilized blend in the last portion of the first extruder. A vacuum vent along the last quarter of the first extruder was used to remove volatile byproducts. The resulting compound was extruded through a die, pelletized by a strand pelletizer, and dried at 45° C.

The invention claimed is:

1. A process for providing a compatibilized polymeric blend composition, comprising:
   providing at least one polyethylene polymer, a reactive moiety, an optional initiator, and an optional catalyst to an upstream portion of a first progressive melt kneading apparatus, the reactive moiety comprising a first reactive group capable of reacting with the polyethylene polymer and a second reactive group capable of reacting with a polyamide polymer to be subsequently provided;
   melt kneading the polyethylene polymer and the reactive moiety so that the first reactive group reacts with the polyethylene polymer and grafts the second reactive group to at least one portion of the polyethylene polymer, thereby forming a molten self-compatibilizer;
   providing at least one molten polyamide polymer to the first progressive melt kneading apparatus; and
   melt kneading the molten self-compatibilizer with the polyamide polymer at a downstream portion of the first progressive melt kneading apparatus so that the second reactive group reacts with at least one portion of the molten polyamide polymer to form the compatibilized polymeric blend composition; and
   wherein the compatibilized polymeric blend composition comprises from 5 to 40 wt % of the polyamide polymer.

2. The process of claim 1, further comprising providing an optional initiator, an optional catalyst, or a reaction accelerator to the upstream portion together with the polyethylene polymer and the reactive moiety.

3. The process of claim 2, wherein the reaction initiator is a free radical initiator, cationic initiator, or anionic initiator.

4. The process of claim 1, wherein the first reactive group and the second reactive group independently comprise a reactive segment selected from the group consisting of carboxyl, anhydride, oxirane, amino, ester, oxazoline, isocyanate, amido, hydroxyl, urethane, silyl, silanol, siloxane, vinyl-terminated silane, vinyl, allyl, acryl, methacryl, diene, and fumaryl.

5. The process of claim 1, wherein only one of the first reactive group and the second reactive group comprises a functional segment having at least one carbon-carbon double bond.

6. The process of claim 1, wherein the molten polyamide polymer is provided from at least one additional melt kneading apparatus into a feed aperture in the first apparatus.

7. The process of claim 1, wherein the molten polyamide polymer is provided from at least one batch mixer into a feed aperture in the first apparatus.

8. The process of claim 1, further comprising the step of adding at least one additive through at least one feed aperture to at least one melt kneading apparatus.

9. The process of claim 8, wherein the additive comprises a short fiber of 10 mm or less selected from the group consisting of glass fiber, ceramic fiber, natural fiber, aramid fiber, mineral fiber, metal fiber, carbon fiber, organic polymer fiber, and combinations thereof.

10. The process of claim 1, further comprising adding at least one roving to the compatibilized polymeric composition.

11. The process of claim 10, wherein the roving is added subsequent to melt kneading the molten self-compatibilizer with the molten polyamide polymer.

12. The process of claim 10, wherein the roving comprises a fiber selected from the group consisting of glass fiber, aramid fiber, ceramic fiber, natural fiber, metal fiber, carbon fiber, organic polymer fiber, and combinations thereof.

13. The process of claim 1, further comprising adding a filler selected from the group consisting of a metal oxide, a metal carbonate, a metal sulfate, a metal phosphate, a metal silicate, a metal borate, a metal hydroxide, a silica, a silicate, an aluminate, an alumo-silicate, chalk, talc, dolomite, saw dust, wood flour, milled natural fibers, newsprint, a metal powder, metal-coated inorganic particles, clay, kaolin, industrial ash, concrete powder, cement, wollastonite, and combinations thereof.

14. The process of claim 1, further comprising adding an unmodified polymer or an external compatibilizer after the molten self-compatibilizer is formed.

15. The process of claim 14, wherein the unmodified polymer is selected from the group consisting of polyethylene; ethylene-vinyl acetate; polypropylene; ethylene-alpholefin elastomer; ethylene-propylene elastomer; ethylene-propylene diene elastomer; polyolefin; an ethylene copolymer; an ethylene terpolymer; ethylene-acrylic esters and ethylene-methacrylic esters; polystyrene; styrene copolymers and terpolymers; styrenic block copolymers; butyl rubber; acrylonitrile butadiene rubber; butadiene rubber; copolymers and terpolymers of butadiene; natural rubber; polyisoprene rubber; polychloroprene; hydrogenated nitrile rubber (HNBR); silicones; polysulfide polymers; vinyl polymers; polyester; an aliphatic polyester; polycarbonate; polyester elastomer; polyamide; polyphthalamide; polyamide elastomer; polyurethane; polyimide; polysulfone; polyphenylene ether; polyphenylene sulfide; polysulfone; liquid crystalline polymer (LOP); polyetheretherketone (PEEK); polyphenylsulfone; polyamide-imide; polyolefins; polyolefin copolymers and terpolymers; EVA; nitrile rubber; an acrylic polymer; fluoropolymer; or copolymers, block copolymers, blends or combinations thereof.

16. The process of claim 14, wherein the external compatibilizer comprises a copolymer or terpolymer of an unsaturated monomer and a functional unsaturated monomer.

17. The process of claim 1, further comprising adding nano-size particles comprising a material selected from the group consisting of clay; silica; silicates; alumosilicates; zinc oxide; titanium oxides; zirconium oxides; talc; nanotubes; metal particles and/or flakes; carbon black; sulfides and sulfates; plant or animal originated cellulose, lignin, or proteins; and combinations thereof.

18. The process of claim 1, further comprising adding a pigment or dye, a UV absorber, a heat stabilizer, a light stabilizer, a HALS, a hydrolysis inhibitor, a lubricant, a slip agent, an antistatic agent, thermally conductive particles, electrically conductive particles, impact modifiers, gas bubbles, liquid droplets, a corrosion inhibitor, a processing aid, a plasticizer, a blowing and/or foaming agent, external compatibilizer, or carbon black.

19. The process of claim 1, wherein the first progressive melt kneading apparatus is an extruder.

20. The process of claim 1, wherein the compatibilized polymeric composition has a continuous phase and a dispersed phase, and the dispersed phase has an average size of less than 10 microns.

21. The process of claim 1, further comprising the step of extruding the compatibilized polymeric composition as an article in the shape of a sheet, film, profile, tube, pipe, or beam.

22. The process of claim 1, further comprising the step of extruding the compatibilized polymeric composition as a pellet, granule, flake, or powder.

23. The process of claim 1, further comprising the step of molding the compatibilized polymeric composition into the shape of a product.

24. The process of claim 23, wherein the molding is done by blow molding, compression molding, transfer molding, injection molding, sheet extrusion followed by compression molding, or calendaring.

25. A process for making a product from a compatibilized polymeric composition, comprising:
providing at least one polyethylene polymer, a reactive moiety, an optional initiator, and an optional catalyst to an upstream portion of a first progressive melt kneading apparatus, the reactive moiety comprising a first reactive group capable of reacting with the polyethylene polymer and a second reactive group capable of reacting with a polyamide polymer to be subsequently provided;
melt kneading the polyethylene polymer and the reactive moiety so that the first reactive group reacts with the polyethylene polymer and grafts the second reactive group to the polyethylene polymer, thereby forming a molten self-compatibilizer;
providing at least one molten polyamide polymer to the first progressive melt kneading apparatus;
melt kneading the molten self-compatibilizer with the molten polyamide polymer at a downstream portion of the first progressive melt kneading apparatus so that the second reactive group reacts with the molten polyamide polymer to form the compatibilized polymeric composition; and
producing a product from the compatibilized polymeric composition;
wherein the compatibilized polymeric blend composition comprises from 5 to 40 wt % of the at least one molten polyamide polymer.

26. The process of claim 25, wherein the step of producing a product is performed by feeding the compatibilized polymeric composition to a direct molding or direct extrusion process.

27. The process of claim 25, wherein the product is produced by blow molding, compression molding, transfer molding, injection molding, sheet extrusion followed by compression molding, or calendaring.

28. The process of claim 25, wherein the first reactive group and the second reactive group independently comprise a reactive segment selected from the group consisting of carboxyl, anhydride, oxirane, amino, ester, oxazoline, isocyanate, amido, hydroxyl, urethane, silyl, silanol, siloxane, vinyl-terminated silane, vinyl, allyl, acryl, methacryl, oxirane, diene, and fumaryl.

* * * * *